United States Patent [19]

Baraldi

[11] Patent Number: 4,653,992
[45] Date of Patent: Mar. 31, 1987

[54] CURE PRESS FOR RETREADING TIRES
[75] Inventor: Massimo Baraldi, Akron, Ohio
[73] Assignee: The Firestone Tire & Rubber Company, Akron, Ohio
[21] Appl. No.: 840,793
[22] Filed: Mar. 18, 1986
[51] Int. Cl.$^4$ .............................................. B29B 9/00
[52] U.S. Cl. ..................................... 425/23; 425/17; 425/40; 425/49; 425/51; 425/501; 425/520
[58] Field of Search ...................... 425/17, 19, 20, 22, 425/23, 24, 25, 35, 40, 41, 47, 49, 51, 501, 502, 520

[56] References Cited
U.S. PATENT DOCUMENTS
3,135,997 6/1964 Smyser .................................. 425/22
4,299,647 11/1981 DeHaven ............................. 425/17

FOREIGN PATENT DOCUMENTS
2529901 6/1977 Fed. Rep. of Germany ........ 425/47

Primary Examiner—Bernard Nozick
Attorney, Agent, or Firm—Ernst H. Ruf

[57] ABSTRACT

A segmented matrix cure press retreads pneumatic tires by vulcanizing a tread strip onto a tire casing. The press centers the tire and provides a tailored support to the entire casing periphery of the tire. A bottom mold cavity forming member having a ring with a contoured surface matched to the bead and sidewall areas of one side of the tire is mounted on a vertically movable base plate of the press. A top mold cavity forming member has a similarly shaped contoured ring and is movable into and out of engagement with the bottom member. A standard inflatable inner tube and flap are inserted within a tire which is placed on the contoured surface of the bottom cavity forming member which centers the tire within the press. The top member is lowered onto and locked with the bottom member forming a mold cavity therebetween with the contoured surfaces coinciding with and trapping the bead and sidewall areas of the tire therebetween. The press further includes a segmented matrix and a segmented heating ring which move radially inwardly on slide plates which are slidably mounted on the base plate to engage the unvulcanized tread strip and adjacent tread area of the tire to completely enclose the mold cavity. After the tread is cured by the heating which rings which surrounds the segmented matrix, the top mold cavity forming member is raised, the segmented matrix and heating ring are moved radially outwardly, and the innertube is deflated, thus enabling the cured tire to be removed from the bottom cavity forming member.

21 Claims, 7 Drawing Figures

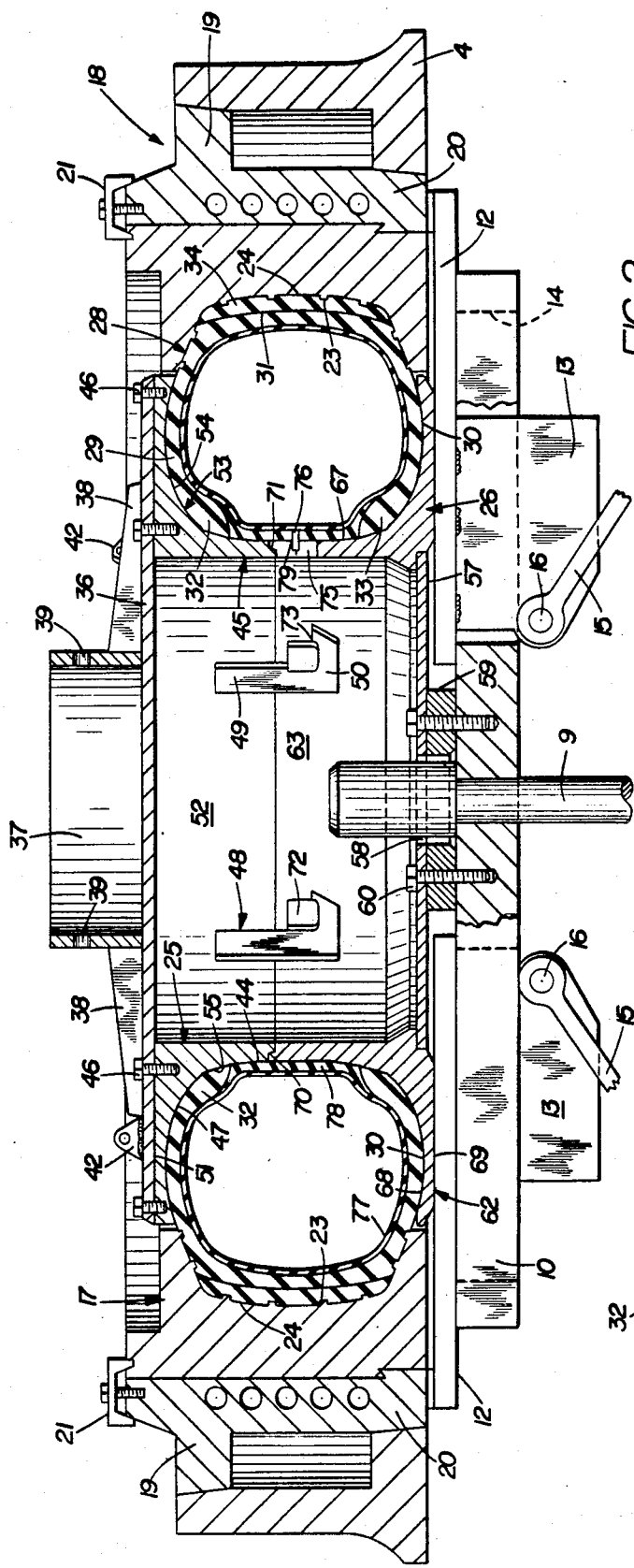

CURE PRESS FOR RETREADING TIRES

TECHNICAL FIELD

The invention relates to curing presses for retreading tires and in particular to a press having a pair of rings with contoured surfaces which provide self centering for a tire placed within the press and which provides support for the entire casing periphery of the tire which is totally enclosed by the rings to lock the tire bead in position during the curing of a strip of tire tread onto the tire body.

BACKGROUND ART

One well known press for retreading tires consists of a standard outer heat ring which holds a plurality of segmented matrices that contain the tire tread pattern. A special curing tube is inserted within the casing of the tire being retreaded and secured therein by a collapsible curing ring. This tire body containing the centering ring and special inflated curing tube is supported on a plywood board which supports one side of the tire sidewall area. A centering ring is then mounted on a central post in the center of the cure press and has a vertically extending outer annular wall which abuts against the lowermost peripheral edge of the tire bead area to maintain the tire centered within the press. The matrix covers approximately one-third of the tire section height (tread area and adjacent side wall areas), with the bead area being relatively unrestrained and free to move within the press during the curing operation. Such presses are generally referred to as having a free floating bead configuration since the bead area of the tire is freely movable within the press and is substantially unrestrained against movement during the curing of the retread strip on the outer periphery of the tire.

Although such cure presses have proved satisfactory for the retreading of tires, they possess certain undesirable characteristics. The curing tube is a specially designed inflatible member requiring a special construction for each general range of tire sizes and must be replaced after a relatively small number of retread operations. Also, the collapsible curing ring which maintains the inflatible tube in position within the press is relatively heavy and difficult to install and remove within a tire casing thereby increasing the amount of work and effort required by the operator performing the retread operation. In addition, the plywood boards on which the tire and centering rings are supported require frequent replacement. Likewise, the tire centering ring is relatively heavy and is difficult to handle increasing even further the effort required by an operator during the retreading of a tire since the centering ring must be installed and removed for each retread operation together with the special inflatible innertube and collapsible curing ring used therewith.

Many of the problems and disadvantages with cure presses having a free floating bead configuration and construction described above are believed to be overcome by my improved cure press described below. Although other cure presses are known in the prior art which trap the bead area of the tire during the retread operation, none are believed to accomplish the desired results in the same manner as the improved cure press of my invention.

U.S. Pat. No. 1,917,110 discloses a retreader in which the tire casing bead is trapped during curing by a curved annular rim having upturned end flanges similar to a usual vehicle tire rim. U.S. Pat. No. 2,597,550 uses a rubber strip bonded about a metal insert for sealing the bead area of the tire against a complementary shaped recess formed in an annular ring-like member which is trapped between a pair of movable mold sections. U.S. Pat. No. 3,118,181 uses an inflatable tube which presses the bead area of the tire against the edges of split mold sections which extend about the sidewalls and tread area of the tire. U.S. Pat. No. 3,925,129 shows another tire cure press which uses a standard annular shaped rim for trapping the bead area of the tire with the sidewall areas being restrained by the sidewalls of the matrix. U.S. Pat. No. 3,969,179 discloses another cure press which uses an annular rim which is retained within a lower mold section for trapping and holding the bead area of the tire while a cure bag is inflated within the tire. The sidewalls of the tire are held in position by a pair of mold sections.

Several foreign patents also disclose other prior art retreading presses which trap the bead area of the tire such as U.K. Pat. No. 1,026,536 which uses a plurality of discs having specially shaped outer peripheries which form recesses into which the bead areas of the tire are trapped and held during curing on the strip of retread rubber thereon. A cure press in U.K. Pat. No. 555,680 traps the tire bead area between a pair of outer mold sections mounted on an enlarged annular rim member. The bead areas are restrained from outward movement by the mold halves which are seated within the upturned flanges of the annular rim. French Pat. No. 1,301,779 shows another cure press having two half mold sections which move axially towards each other for trapping the tire including the bead areas therebetween.

Although the concept of trapping the bead area of a tire is shown in the prior art, no known cure press provides a construction which enables the use of segmented matrices, provides for the self centering of the tire, while providing tailored support to the entire casing and bead area of the tire and which uses a standard innertube for inflating the tire within the press as does my invention.

DISCLOSURE OF THE INVENTION

Objectives of the invention include providing an improved cure press for retreading of tires which transforms a heretofore curing system from a free floating bead configuration to a locked self-centering bead configuration by the use of a pair of mold cavity members having annular rings with specifically contoured sidewall/bead matching surfaces and a matrix cover plate designed to fit into a usual segmented matrix type of press in such a way as to provide self centering of the tire and at the same time providing tailored support to the entire casing periphery of the tire which is totally enclosed within the mold cavity forming members and segmented matrix. Another objective is to provide such an improved cure press which eliminates the heretofore tire centering ring and specially designed collapsible curing ring and curing tube and plywood slide board required with prior art press constructions by the use of a pair of specially designed contoured sidewall/bead members which enable the use of a usual or standard, commerically available, pneumatic tire innertube and flap to provide the internal curing pressure.

A further objective of the invention is to provide such an improved cure press which reduces bagging and debagging time due to the elimination of the heretofore used heavy and bulky tire centering ring, collapsible curing ring and special inflatible curing tube, and which provides a cure press that is easier to handle, provides a higher number of cures with a standard innertube than with the specially designed curing tubes, and which results in a lower cost per cured tire.

These objectives and advantages are obtained by the improved cure press of the invention, the general nature of which may be stated as including a cure press for retreading a tire body with a strip of retread stock extending around the periphery of the tire body wherein the cure press is of the type having a base plate mounted for reciprocal vertical movement, slide plates slidably mounted for reciprocal radial movement on the base plate, means for slidably moving the slide plates along the base plate in response to the vertical movement of the base plate; and a heated segmented matrix containing a tread pattern mounted on the slide plates for radial movement therewith; wherein said improvement includes top and bottom mold cavity forming members axially movably mounted with respect to each other for movement between open and closed positions, with the bottom member being mounted on the base plate for vertical movement therewith, each of said members having an inner annular curved surface configured to match the contour of a respective one of the tire body sidewalls and bead areas, to retain the sidewall and bead areas of the tire body, wherein said curved surfaces of the cavity forming members together with the segmented matrix forming an annular mold cavity configured to match the contour of the tire body and to support generally the entire periphery of said tire body when said cavity forming members are in a closed position and the segmented matrix is moved inwardly by the slide plates; lock means for securing the top and bottom members in a closed position; a fluid pressure inflatible innertube, having an inflation valve, adapted to be inserted into the interior of the tire body; and opening means, formed in at least one of the cavity forming members for providing access to the inner tube valve for inflating the innertube to force the tire body outwardly against the surfaces of the cavity forming members and segmented matrix.

BRIEF DESCRIPTION OF THE DRAWINGS

A preferred embodiment of the invention, illustrative of the best mode in which applicant contemplates applying the principles, is set forth in the following description and is shown in the drawings, and is particularly and distinctly pointed out and set forth in the appended claims.

FIG. 2 is an enlarged, fragmentary sectional view with portions broken away, showing the improved cure press in closed position with a tire being retreaded mounted therein;

FIG. 6 is an enlarged fragmentary sectional view showing the bead area of the tire and protective flap shown in section with the top and bottom mold cavity forming members being in a closed position; and FIG. 7 is a fragmentary diagrammatic top plan view of the cure press showing two of the segmented slide plates in a radial outward expanded position.

Similar numerals refer to similar parts throughout the drawings.

BEST MODE FOR CARRYING OUT THE INVENTION

Figure 1:
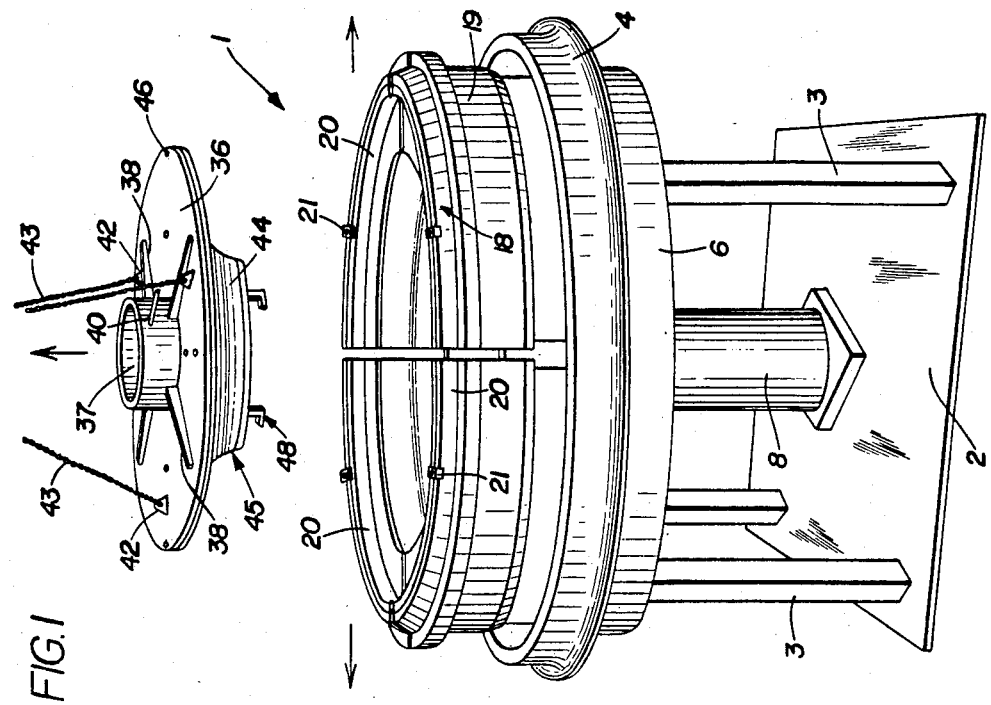
FIG. 1 is a diagrammatic perspective view of the improved cure press with the top mold cavity forming member being shown in a raised position and the press shown in a partially opened position.

The improved cure press is indicated generally at 1, and is shown diagrammatically in FIG. 1 in a partially opened position. Press 1 includes a base platform 2 and a plurality of supporting legs 3 on which is supported an annular shaped upper housing 4 and lower housing 6. A hydraulic or pneumatic pressure actuated piston mechanism 8 extends upwardly from base platform 2 and through the center of housings 4 and 6 and has a piston 9 (FIGS. 2 and 3) which is vertically reciprocally movable therethrough. An annular shaped press base plate 10 is connected to piston 9 for vertical movement into and out of upper housing 4 in conjunction with the movement of piston 9.

A plurality of arcuate shaped slide plates 12 are radially slidably mounted on base plate 10 for movement therealong between extended and retracted positions by connected slide blocks 13 which extend upwardly through slotted holes 14 formed in base plate 10. Levers 15 are pivotally mounted at 16 to each slide block 13 (FIGS. 2 and 3) and are pivotally connected at their lower end to housing 6. The upward vertical movement of piston 9 and connected base plate 10 will cause slide plates 12 to move radially outwardly along base plate 10 through the action of pivotally mounted levers 15. Slide plates 12 will move radially inwardly to the retracted positions as shown in FIG. 2 upon the vertical downward movement of piston 9. Slide plates 12 are shown in their radially outward extended positions in FIG. 3 and the inward radial closed position in FIG. 2.

A heating ring indicated generally at 18, formed by a plurality of heating rings segments 19, is fixedly mounted on the outer ends of slide plates 12. A matrix indicated generally at 17 which is formed of a plurality of segmented matrices 20 is fixedly mounted to the outer ends of slide plates 12 and is secured to heating ring segments by clamps 21. Matrix 17 has a tire tread pattern 23 of any desired configuration formed along the concave annular inner surface 24 thereof. The above described press construction and components thereof is known prior art and is a type of press which is improved to achieve the desired effects of the invention. An example of such a cure press having the above described components and which is referred to as having a free floating bead configuration and segmented matrix is manufactured by National Equipment & Mold Corporation of Lima, Ohio, identified under its trademark EXPAND-O-MAT CURING PRESS.

Figure 3:
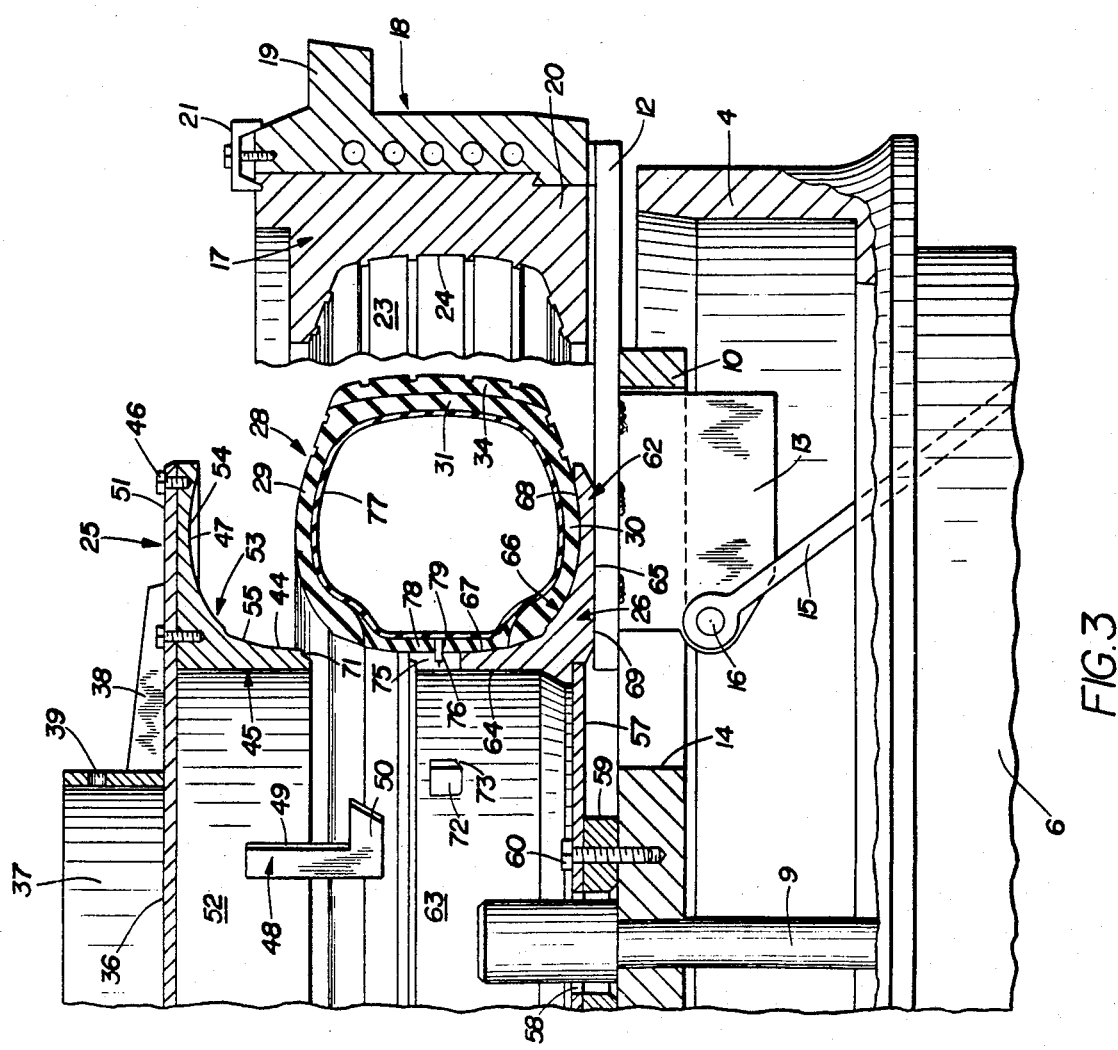
FIG. 3 is an enlarged fragmentary view with portions broken away and in section showing the cure press in an opened position and the top mold cavity forming member in a partially raised position.

A known type of pneumatic tire to be retreaded in improved cure press 1 is indicated generally at 28, and includes a usual pair of sidewalls 29 and 30, an outer peripheral tread area 31 and a pair of bead areas 32 and 33 (FIGS. 2 and 3). A strip of rubber forming the retread strip 34 is shown secured about tread area 31.

In accordance with the invention, top and bottom mold cavity forming members indicated generally at 25 and 26, respectively, (FIGS. 4 and 5) are provided for supporting sidewall areas 29-30 and for trapping bead areas 32-33 of tire 28. Top cavity forming member 25 includes an annular shaped flat cover plate 36 having a cylindrical collar 37 extending upwardly therefrom and secured thereto by a plurality of reinforcing ribs 38. A pair of aligned holes 39 may be formed in collar 37 for receiving a bar 40 (FIG. 1) for rotating top member 25 into and out of locked position with bottom cavity forming member 26 as described in greater detail below. A plurality of lifting lugs 42 are attached at equally spaced locations about the top surface of cover plate 36 for attachment of lifting chains 43.

Figure 4:
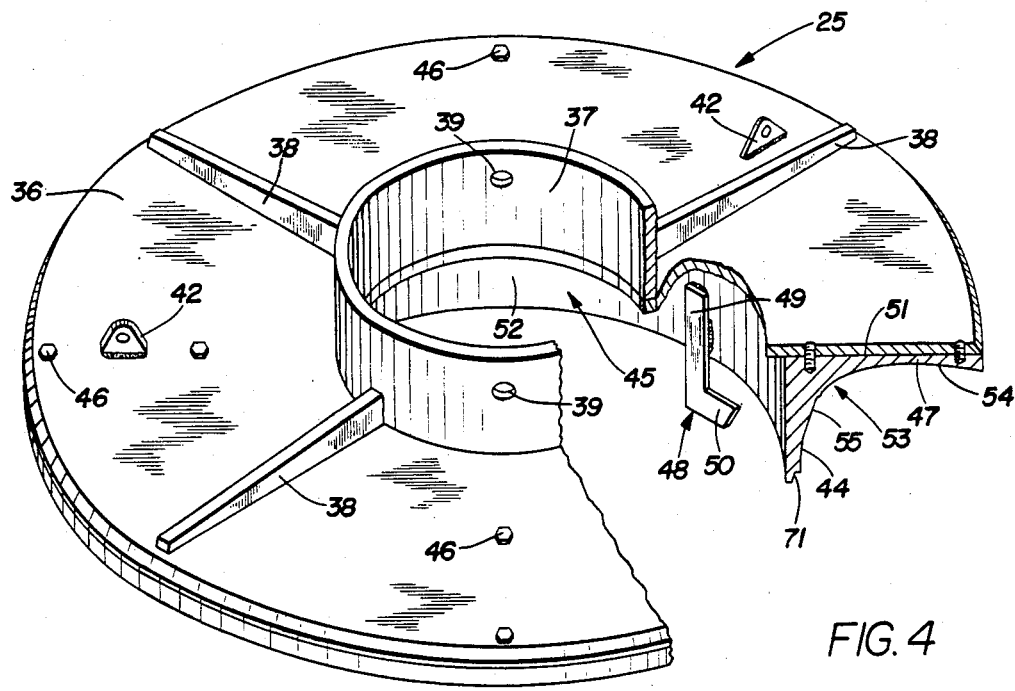
FIG. 4 is a fragmentary elevational view of the top mold cavity forming member with portions broken away and in section.
Figure 5:
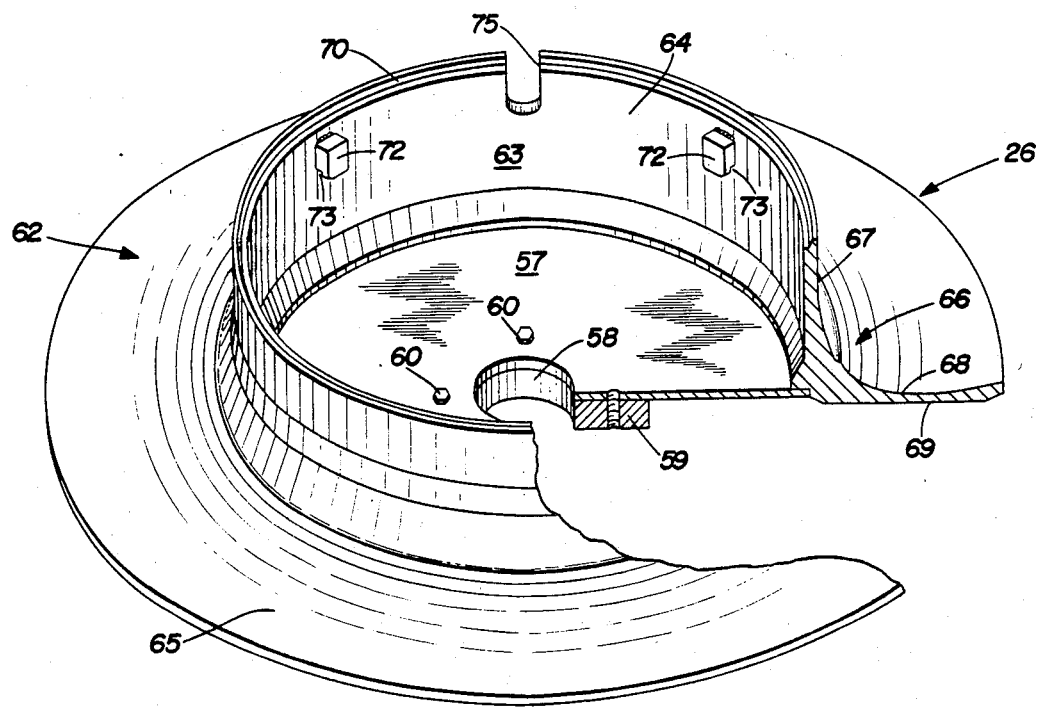
FIG. 5 is a fragmentary elevational view of the bottom mold cavity forming member with portions broken away and in section.

A specially contoured sidewall/bead ring indicated generally at 45 is secured to the underside surface of cover plate 36 by a plurality of bolts 46. Contoured ring 45 has a generally L-shaped configuration with a horizontally extending annular wall 47 and a downwardly extending annular wall 44. Wall 47 has a smooth top surface 51 which is abutted against the bottom surface of cover plate 36 and a slightly curved concave sidewall confining surface 54 which together with a slightly concave bead trapping surface 55 forms the contoured inner surface indicated generally at 53, of ring 45. Wall 44 futher includes a smooth cylindrical inner surface 52. A plurality of locking hooks indicated generally at 48 are welded to wall surface 52 of contoured ring 45 and extend downwardly therefrom as shown in FIG. 4. Each hook 48 includes a vertical attachment leg 49 and a locking leg 50 forming a generally L-shaped configuration. Preferably three or more locking hooks 48 are spaced equally about contour ring 45.

Bottom cavity forming member 26 (FIG. 5) includes an annular disc shaped central mounting plate 57 having a center opening 58 formed therein. An annular collar 59 is attached, as for example by welding, to the bottom surface of plate 57 and surrounds opening 58. Bolts 60 attach cavity forming member 26 onto press base plate 10 as shown particularly in FIGS. 2 and 3.

A contoured ring indicated generally at 62, is welded to the outer periphery of mounting plate 57. Contoured ring 62 has a generally L-shaped configuration formed by a upstanding wall 64 and a horizontal wall 65. Contoured ring walls 64 and 65 form a contoured outer surface indicated generally at 66, having a slightly concave bead trapping or retaining surface 67 and a slightly concaved sidewall trapping surface 68. Wall 64 has a cylindrical inner surface 63 and wall 65 has a generally flat annular lower surface 69. The top peripheral edge of upstanding wall 64 has a stepped edge 70 which mates with a complementary shaped stepped edge 71 formed on the bottom of vertical wall 44 of contoured ring 45 to provide a locking engagement with edge 70 when contoured rings 45 and 62 are in the abutting closed position as shown in FIG. 2.

A plurality of locking lugs 72 are welded to inner surface 63 of contour ring 62 (FIG. 5) and are spaced equally circumferentially about surface 63 and have a stepped lower edge 73 for slidably receiving locking legs 50 of locking hooks 48 therein. A U-shaped opening 75 is formed at one location along upstanding wall 64 of contoured ring 62 for receiving a valve stem 76 of a standard inflatable innertube 77 (FIGS. 2 and 3).

The manner of operation and interrelationship of the various components and features described above of improved cure press 1 is set forth below. A tire 28 to be retreaded is initially bagged with an innertube 77 and has a band of an elastomeric material 78 referred to as a flap, placed between bead areas 32 and 33 of the tire as shown in FIGS. 2, 3, and 6. Innertube valve stem 76 projects through a hole 79 in flap 78. Top cavity forming member 25 will be in the raised position as shown in FIG. 1 and piston assembly 8 will place piston 9 in its raised position as shown in FIG. 3. In this raised piston position, base plate 10 will be in the vertically raised position with slide plates 12 being in their outward radially extended positions through the action of slide blocks 13 and levers 15. With cavity forming members 25 and 26 being in the position shown in FIG. 1 a bagged tire fitted with the innertube and flap can be placed on bottom cavity forming member 26 within the press as shown in FIG. 3.

After the bagged tire is placed on contoured surface 62 of lower member 26, upper cavity forming member 25 is then lowered from the position of FIG. 3 to that of FIG. 3 and then into abutting engagement with bottom cavity forming member 26 as shown in FIG. 2. When top member 25 initially abuts bottom member 26, locking hooks 48 will be disengaged from locking lugs 72. Top member 25 then is rotated by means of a locking bar 40 which will engage locking legs 50 of hooks 48 within stepped edge 73 of locking lugs 72 to securely close cavity forming members 25 and 26 as shown in FIG. 2. An air hose (not shown), which was connected to valve stem 76 before top member 25 was placed on bottom member 26 inflates innertube 77 to a pressure of approximately 20 psi. Prior to inserting tire 28 within the bottom cavity forming member 26, a usual strip of retread rubber 34 is placed about the outer circumference of tread area 31 as is customary in a retread operation.

After the tire is inflated and secured within locked cavity forming members 25 and 26, a usual cycle start button is actuated energizing piston assembly 8 and lowering piston 9 from the raised position of FIG. 3 to the lowered position of FIG. 2. This movement slidably moves slide plates 12 and correspondingly matrix 17 and heating ring 18 radially inwardly, from the position of FIG. 3 to that of FIG. 2, towards the outer edges of cavity forming members 25 and 26. The tire is then cured by the curing heat being applied to tread strip 34 through heating ring 18 in a standard cure cycle. At the end of the cure cycle, the press timer will automatically release the curing pressure applied by matrix 17 and will open the matrix by moving piston 9 upwardly, and correspondingly moving matrix 17 radially outwardly by the radial movement of slide plates 12. Top cavity member 25 then is rotated by bar 40 to disengage locking hooks 48 from locking lugs 72. Top member 25 then is lifted upwardly by use of lifting chains 43 or other power assisted mechanism. Innertube 77 is deflated permitting the manual removal of the cured tire from bottom cavity member 26.

Thus, during the curing cycle the entire periphery of the tire, namely, the tread areas, sidewalls and bead areas are supported and confined in the inflated condition within the completely enclosed cavity formed by contour rings 45 and 62 of cavity forming members 25 and 26, respectively, and by collapsed matrix 17. Rings 45 and 62 are extremely durable components and are formed of rigid metal.

In accordance with one of the main features of the invention, innertube 77 which is mounted within the tire is of a standard and/or commerically available construction and completely eliminates the need of a specially designed inflatable tube and expansion ring heretofore required for insertion within a tire when cured in a press construction permitting a floating bead condition. These tubes can be used for a considerable number of tires before requiring replacement, and then are replaced with a readily available, extremely inexpensive standard inner tube. Likewise, the mounting of contoured rings 45 and 62 on cover plate 36 and mounting plate 57, respectively, to fabricate cavity forming members 25 and 26 provides relatively simple components which are being easily adapted for placement within a segmented cure press by attachment to vertically movable base plate 10 by collar 59. Thus, the specially designed cure tube and collapsible curing ring and the tire centering ring and plywood base board of the prior art segmented matrix type of cure press have been completely eliminated and replaced with the relatively simple, highly efficient and durable top and bottom cavity forming members 25 and 26. An operator can perform a greater number of retread operations than heretofore possible without excess fatigue since the improved cure press eliminates the need of removing and reinstalling the tire centering ring and collapsible curing ring and special curing tube for each cured tire and requires only the insertion of a standard innertube and flap in the tire before placing it in a deflated condition on bottom cavity forming member 26 and then lowering top cavity forming member 25 thereon by a power operated assist means such as a hydraulic or pneumatic hoist.

Therefore improved cure press 1 eliminates a number of special components heretofore required for similar tire retread cure presses, enables standard and readily available innertubes and protective flaps to be used for providing the internal curing pressure, reduces the bagging and debagging time for each tire, provides for a lighter and easier handled tire, and results in a lower retread cost per tire than that provided by heretofore segmented matrix curing presses.

Accordingly, the improved cure press construction is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding, but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved cure press construction is conceived and used, the characteristics of the construction, and the advantageous, new and useful results obtained; the new and useful structures, devices, elements, arrangements, parts, and combinations, are set forth in the appended claims.

What is claimed is:

1. An improved cure press for retreading a tire body with a strip of retread stock extending around the periphery of the tire body wherein the cure press is of the type having a base plate mounted for reciprocal vertical movement, slide plates slidably mounted for reciprocal radial movement on the base plate, means for slidably moving the slide plates along the base plate in response to the vertical movement of the base plate; and a heated segmented matrix containing a tread pattern mounted on the slide plate for radial movement therewith; wherein said improvement includes:

(a) top and bottom mold cavity forming members, axially movably mounted with respect to each other for movement between open and closed positions, with the bottom member being mounted on the base plate for vertical movement therewith, each of said members having an annular curved surface, configured to match the contour of a respective one of the tire body sidewalls and bead areas, to retain the sidewall and bead area of the tire body, with said curved surfaces of the cavity forming members together with the segmented matrix forming an annular mold cavity configured to match the contour of the tire body and to support generally the entire periphery of said tire body when said cavity forming members are in a closed position and the tread segments are moved inwardly by the slide plates;

(b) lock means for securing the top and bottom members in a closed position;

(c) a fluid pressure inflatable, innertube having an inflation valve, adapted to be inserted into the interior of the tire body; and (d) opening means, formed in at least one of the cavity forming members, for providing access to the innertube valve for inflating the innertube to force the tire body outwardly against the surfaces of the cavity forming members and segmented matrix.

2. The improved cure press defined in claim 1 in which the bottom mold cavity forming member includes a flat disc-shaped plate and a ring having the curved surface contoured to match the sidewall and bead area of the tire being processed; in which the ring is attached to the outer periphery of the plate; and in which the plate is attached to the base plate of the press for vertical movement with said press base plate.

3. The improved cure press defined in claim 1 in which the contoured surface of the bottom mold cavity forming member ring has a generally concave bottom surface portion integral with a generally concave upstanding surface portion, with said bottom surface portion being configured to match the sidewall area of the tire and said upstanding surface portion being configured to trap the bead area of the tire.

4. The improved cure press defined in claim 1 in which the top mold cavity member has a top cover plate; and in which means is provided on top cover plate for rotating the top mold cavity forming member to lock said member in the closed position with the bottom mold cavity forming member.

5. The improved cure press defined in claim 1 in which a strip of elastomeric material is placed between a portion of the innertube and portions of the annular curved surfaces of the cavity mold forming members configured to match the contours of the bead areas of the tire body.

6. The improved cure press defined in claim 1 in which the bottom mold cavity forming member includes an annular ring generally L-shaped in cross section having a horizontally outwardly extending sidewall retaining surface and an upstanding bead retaining surface located radially inwardly of the sidewall retaining surface, and in which said bottom mold cavity forming member further includes a flat disc-shaped plate with said annular ring being secured to an outer peripheral edge of said disc-shaped base plate.

7. The improved cure press defined in claim 6 in which the opening means for the innertube inflation valve is formed in the upstanding bead retaining surface of the annular ring of the bottom cavity forming member.

8. The improved cure press defined in claim 6 in which the top mold cavity forming member includes an annular ring similar in cross-sectional configuration and size to the annular ring of the bottom mold cavity forming member with said ring having a horizontally outwardly extending sidewall retaining surface and a downwardly extending bead retaining surface located radially inwardly of the sidewall retaining surface; and in which said top mold cavity forming member further includes a cover plate, with said annular ring being secured to said cover plate.

9. The improved cure press defined in claim 8 in which the annular ring of the top mold cavity forming member is mounted by a plurality of features to the cover plate; and in which means is provided on the cover plate for moving the top mold cavity forming member with respect to the bottom mold cavity forming member for moving said members between the open and closed positions.

10. The improved cure press defined in claim 8 in which the lock means includes a plurality of blocks attached to one of the annular rings and a plurality of hooks attached to the other of said annular rings; and in which the hooks are slidably engaged with the blocks upon rotational movement of the top mold cavity forming member with respect to the bottom mold cavity forming member to lock said members in the closed position.

11. The improved cure press defined in claim 10 in which the lock means blocks are located at spaced intervals about an inner surface of the annular ring of the bottom mold cavity forming member; and in which the hooks are located at spaced intervals about an inner surface of the annular ring of the top mold cavity forming member and extend downwardly therefrom for sliding engagement with the lock means blocks.

12. A cure press for retreading a tire body with a strip of retread stock extending around the periphery of the tire body, including:
 (a) a housing;
 (b) a base plate mounted for reciprocal vertical movement into and out of said housing;
 (c) a plurality of slide plates slidably mounted for reciprocal radial movement on the base plate;
 (d) means for slidably moving the slide plates along the base plate in response to the vertical movement of the base plate;
 (e) a heated segmented matrix containing a tread pattern mounted on the slide plate for radial movement therewith;
 (f) a bottom mold cavity forming member mounted on the base plate for vertical movement therewith, and a top mold cavity forming member movably mounted with respect to said bottom member for movement between open and closed positions, each of said members having an annular curved surface, configured to match the contour of a respective one of the tire body sidewalls and bead areas, to retain the sidewall and bead area of the tire body, with said curved surfaces of the cavity forming members together with the segmented matrix forming an annular mold cavity configured to match the contour of the tire body and to support generally the entire periphery of said tire body when said cavity forming members are in a closed position and the segmented matrix is moved inwardly by the slide plate;
 (g) means for securing the top and bottom cavity forming members in a closed position;
 (h) a fluid pressure inflatable innertube, having an inflation valve, adapted to be inserted into the interior of the tire body; and
 (i) means for inflating the innertube to force the tire body outwardly against the surfaces of the cavity forming members and segmented matrix.

13. The improved cure press defined in claim 12 in which the top mold cavity forming member has a top cover plate; and in which means is provided on top cover plate for rotating the top mold cavity forming member to secure said member in the closed position with the bottom mold cavity forming member.

14. The improved cure press defined in claim 12 in which a strip of elastomeric material is placed between a portion of the innertube and portions of the annular curved surfaces of the cavity forming members configured to match the contours of the bead areas of the tire body.

15. The improved cure press defined in claim 12 in which the bottom mold cavity forming member includes a flat disc-shaped plate and a ring having the curved surface contoured to match the sidewall and bead area of the tire being processed; in which the ring is attached to the outer periphery of the plate; and in which the plate is attached to the base plate of the press for vertical movement with said press base plate.

16. The improved cure press defined in claim 15 in which the contoured surface of the bottom mold cavity forming member ring has a generally concave bottom surface portion integral with a generally concave upstanding surface portion, with said bottom surface portion being configured to match the sidewall area of the tire and said upstanding surface portion being configured to trap the bead area of the tire.

17. The improved cure press defined in claim 12 in which the bottom mold cavity forming member includes an annular ring generally L-shaped in cross section having a horizontally outwardly extending sidewall retaining surface and an upstanding bead retaining surface located radially inwardly of the sidewall retaining surface; and in which said bottom mold cavity forming member further includes a flat disc-shaped plate with said annular ring being secured to an outer peripheral edge of said disc-shaped plate.

18. The improved cure press defined in claim 17 in which the inflating means includes an opening formed in the upstanding bead retaining surface of the annular ring of the bottom cavity forming member providing access to the innertube inflation valve.

19. The improved cure press defined in claim 17 in which the top mold cavity forming member includes an annular ring similar in cross-sectional configuration and size to the annular ring of the bottom mold cavity forming member with said ring having a horizontally outwardly extending sidewall retaining surface and a downwardly extending bead retaining surface located radially inwardly of the sidewall retaining surface; and in which said top mold cavity forming member further includes a cover plate, with said annular ring being secured to said cover plate.

20. The improved cure press defined in claim 19 in which the annular ring of the top mold cavity forming member is mounted by a plurality of fasteners to the cover plate; and in which means is provided on the cover plate for moving the top mold cavity forming member with respect to the bottom mold cavity forming member for moving said members between the open and closed positions.

21. The improved cure press defined in claim 19 in which the means for securing the top and bottom cavity forming members in the closed position includes a plurality of blocks attached to one of the annular rings and a plurality of hooks attached to the other of said annular rings; and in which the hooks are slidably engaged with the blocks upon rotational movement of the top mold cavity forming member with respect to the bottom mold cavity forming member to lock said members in the closed position.

* * * * *